United States Patent [19]

Dolev

[11] Patent Number: 4,905,965
[45] Date of Patent: Mar. 6, 1990

[54] QUICK-DISCONNECT HOSE COUPLING DEVICE

[75] Inventor: Moshe Dolev, Ramat Hasharon, Israel

[73] Assignee: Sagiv Registered Partnership, Halutza, Israel

[21] Appl. No.: 384,784

[22] Filed: Jul. 25, 1989

[30] Foreign Application Priority Data

Aug. 1, 1988 [IL] Israel .................................. 87280

[51] Int. Cl.⁴ .............................................. F16L 37/28
[52] U.S. Cl. .................................. 251/149.9; 251/89.5; 285/91; 285/307
[58] Field of Search ................. 137/637.05, 614.06; 251/149.9, 89.5, 149.5; 285/84, 85, 91, 307, 404

[56] References Cited

U.S. PATENT DOCUMENTS

| | | | |
|---|---|---|---|
| 2,514,717 | 7/1950 | Power | 137/637.05 |
| 2,749,146 | 6/1956 | Gumbert et al. | 137/637.05 |
| 3,383,122 | 5/1968 | Richardson | 285/91 |
| 4,397,445 | 8/1983 | Burquier | 251/89.5 |

*Primary Examiner*—A. Michael Chambers
*Attorney, Agent, or Firm*—Edward Langer

[57] ABSTRACT

An improved quick-disconnect hose coupling comprising a female coupling half having a ball valve designed with positive interlocking means for retention of a male coupling half in a receptacle formed therein. The ball valve is enclosed in a housing and is arranged to be pivotable therein about an axis, such that the male coupling half communicates with a bore hole in the other end of the ball valve. Pivoting movement of the ball valve provides a flow connection by bringing the bore hole into communication with a hose connector element retained in the other end of the housing, while interlocking pins contained in the ball valve mechanically engage the male coupling half in the receptacle. In one embodiment, a releasable latch engages a contoured slot in the housing for providing positively defined valve operating positions, such that the mechanical connection is completed prior to and separate from the flow connection. In another embodiment, the latch is provided by a pair of beads each of which is seated within one of a pair of apertures formed on opposite sides of the ball valve walls. Each latching bead is retained against a notched fastener on a respective side of the ball valve. A movable locking sleeve disposed within the ball valve blocks the latching beads from inward movement in the apertures, thus preventing ball valve rotation. Upon depression of the male coupling half in the locking sleeve, the blockage is removed and the valve may be rotated, releasing the interlocking pins and allowing removal of the male coupling half. The novel design offers increased safety and simplicity of operation.

19 Claims, 5 Drawing Sheets

QUICK-DISCONNECT HOSE COUPLING DEVICE

FIELD OF THE INVENTION

The present invention relates to hose couplings, connectors and fittings, and more particularly, to a quick-disconnect female hose coupling half which provides positive interlocking and latching means which move during adjustment between flow and blocking positions of a ball valve.

BACKGROUND OF THE INVENTION

The prior art of quick-disconnect hose couplings includes a well-known design covered by U.S. Milspec-MIL-C- 4109 E (Oct. 1976), which is in widespread commercial use and provides a spring-loaded poppet valve in a female coupling half which is directly in-line with a male coupling half. An example of a spring-loaded poppet valve construction is given by U.S. Pat. No. 4,420,022 to Landry. One disadvantage of this design is that the poppet valve somewhat reduces fluid or air flow since it is located in the flow path.

Another problem with this design is that upon insertion of the male coupling half, an unsafe condition occurs as fluid or air flow is allowed prior to completion of the mechanical connection. Where compressed air or gas is used, for example, the premature flow connection is especially dangerous as the couplings may be blown apart from one another as they are being connected or disconnected. Recognition of the danger posed in this condition is evidenced by the U.S. safety standard published as OSHA 1926.302 (b-1), which calls for the use of "positive means" to secure the hose to a pneumatic power tool to prevent accidental disconnection.

Another type of hose coupling uses a ball valve or swivel valve construction enabling mechanical connection of the male coupling half while the valve is in a blocked position, thus separating the mechanical and flow connection stages. Examples of this type of construction are given by U.S. Pat. No. 4,662,396 to Avnon, and French Pat. Nos. 2.466.696, 2.068.039, 2.028.653 and 1.008.934. These patents disclose a mechanical connection which is provided by a pair of shoulders formed in the ball valve housing which restrain a collar on the male coupling half as the ball valve is moved approximately 45 degrees between positions. Because the collar is spaced apart from the ball valve pivot point, friction is generated over the arc of travel resulting in gradual wearout of the mechanical connection and shortening of the useful life.

The various hose coupling designs described above require costly forging and machining processes for producing the ball valve housing, which drives up the overall unit cost. In addition, unguided movement of the ball valve in the patent to Avnon and in French Pat. Nos. '039 and '696 can result in cases where the ball valve is turned inward and becomes inacessible.

Therefore, it would be desirable to provide a low cost hose coupling device which is easily manipulated for quick connect and disconnect and is designed to minimize wearout of mechanically interlocking parts.

SUMMARY OF THE INVENTION

Accordingly, it is a principal object of the present invention to overcome the above-described disadvantages and provide an improved quick-disconnect female hose coupling half which operates based on the position of a ball valve which has a positive interlocking and latching means for retention of a male coupling half, and is designed to reduce mechanical wearout as it is movable with the ball valve operation.

In accordance with a preferred embodiment of the invention, there is provided a quick-disconnect hose coupling device comprising:

a housing having an opening at an end thereof for retention of a hose connector element therein;

a ball valve body disposed in said housing and being pivotable therein about an axis, said ball valve body having formed therein a receptacle for insertion of a male coupling half through an opening in an opposite end of said housing; and positive interlocking means contained within said ball valve body proximate said pivot axis and cooperating with said housing to allow insertion of said male coupling half in said receptacle when said ball valve body is pivoted to a first position whereat it does not communicate with said connector element, said ball valve being pivotable to a second position whereat said positive interlocking means retentively engages said male coupling half in said receptacle prior to aligment with said connector element for communication therewith, said engagement being releasable when said first position reestablished.

In the preferred embodiment, the quick-disconnect hose coupling of the present invention comprises a housing enclosing a ball valve body arranged to be pivotable therein about an axis. The pivotable ball valve body has a novel shape which defines in one spherical end cap thereof a receptacle for a male coupling half which can be inserted through an opening in one end of the housing. The male coupling half communicates with a bore hole in the other spherical end cap of the ball valve, with pivoting movement of the ball valve providing a flow connection by bringing the bore hole into communication with a hose connector element retained in the other end of the housing. The space between the ball valve spherical end caps is wide, thus reducing the turning angle for pivoting movement between operating positions below that of conventional quick-disconnect ball valve designs.

In accordance with the present invention, the ball valve body is designed to include positive interlocking and latching means comprising interlocking pins for mechanically engaging the male coupling half in the receptacle, and a releasable latch engaging a contoured slot in the housing for providing positively defined valve operating positions. This design allows completion of the mechanical connection prior to and separate from the flow connection, each of which is associated with a predetermined valve operating position.

The interlocking pins are contained within the ball valve body and because they are part of the ball valve body construction, they move together with pivoting movement thereof while their ends ride along the inner surface of the housing. Since the interlocking pins are located proximate the pivot axis and, as mentioned above, the turning angle of pivoting movement is reduced, mechanical friction and wear is also reduced below that of prior art mechanical interlocking designs.

A feature of the invention is the provision of an operating position additional to the mechanical and flow connection operating positions of the ball valve, in which the mechanical connection is maintained but the flow connection is blocked.

Another feature of the invention is provision of the hose connector element with a self-adjusting seal for insuring the integrity of the seal between it and the ball valve.

Still another feature of the invention is the provision of a multi-use hose fitting for use with the hose connector element and the male coupling half, which is designed to include a tapered MPT fitting connected to a barbed hose shank extension, cooperating with a barbed and threaded hose locking sleeve.

In an alternative embodiment, the ball valve body is altered so as to eliminate placement of the releasable latch external to the housing. Instead, the latch is provided as a pair of of beads each of which is seated within one of a pair of apertures formed on opposite sides of the valve body walls. Each latching bead is retained against a notched fastener on a respective side of the ball valve body. The outer edge of a movable locking sleeve disposed within the ball valve body blocks the latching beads from inward movement in the apertures, thus preventing ball valve body rotation. Upon depression of the male coupling half in the locking sleeve, the locking sleeve blockage is removed and the valve body may be rotated since the latching beads are free to move inward within the valve body apertures. The interlocking pins then align with recesses on the inner surface of the housing, allowing removal of the male coupling half.

Based on its unique design, the inventive hose coupling offers safety and simplicity of operation together with lower manufacturing costs. The positive interlocking and latching features provide increased safety against undesired operating conditions such as accidental disconnection, and the novel design reduces mechanical friction and increases the useful life.

Other features and advantages of the invention will become apparent from the drawings and description hereinbelow.

BRIEF DESCRIPTION OF THE DRAWINGS

For a better understanding of the invention with regard to the various embodiments thereof, reference is made to the accompanying drawings in which.

DETAILED DESCRIPTION OF THE PREFERRED EMBODIMENTS

Figure 1:
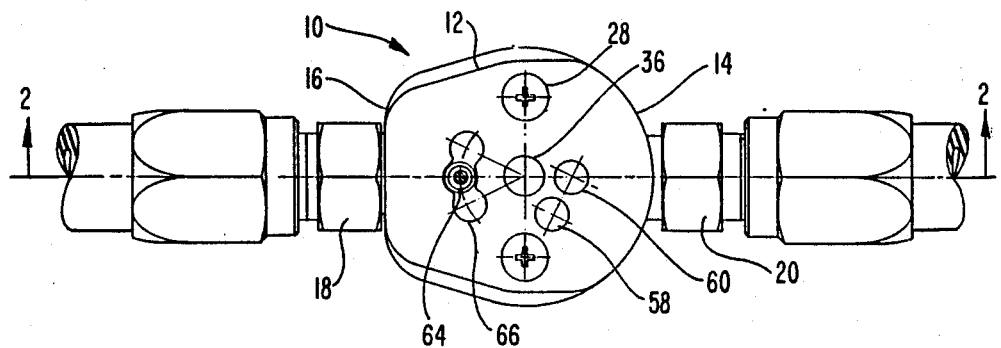
FIG. 1 is a top view of a quick-disconnect hose coupling constructed and operative in accordance with a preferred embodiment of the present invention, shown in a normal operating position enabling fluid or air flow therethrough.

Referring now to the drawings in which like numerals designate correspondings sections or elements throughout, in FIG. 1 there is shown generally designated by reference numeral 10 a quick-disconnect female hose coupling half constructed and operative in accordance with a preferred embodiment of the present invention. Hose coupling 10 comprises a housing 12 having openings 14 and 16 at opposite ends thereof, with a hose connector 18 located in opening 16, and a male coupling half 20 designed for removable insertion in opening 14 by virtue of a quick connect and disconnect function of hose coupling 10 as further described herein. Hose connector element 18 is permanently connected to and freely rotatable about housing 12 at opening 16, by provision of a collar 22 as best seen in FIG. 2.

Figure 2:
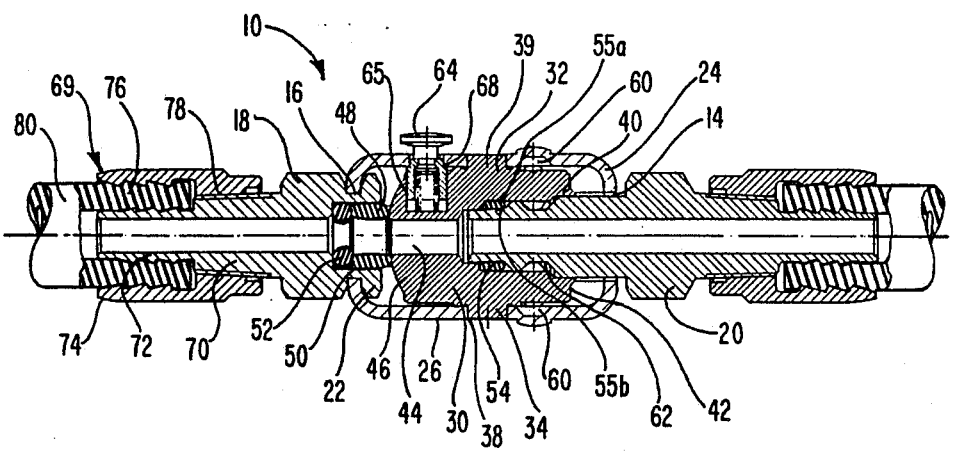
FIG. 2 shows a cross-sectional view of the hose coupling of FIG. 1 taken along lines section lines 2—2 thereof.

As shown in the cross-sectional view of FIG. 2 taken along section line 2—2 of FIG. 1, housing 12 comprises a pair of shell-shaped upper and lower sections 24 and 26. Sections 24 and 26 are held together by fasteners 28 (FIG. 1), and enclose a ball valve body 30. Sections 24 and 26 may be separately stamped parts, thereby offering cost advantages. A pair of raised lugs 32 and 34 on opposite sides of valve body 30 are seated respectively in holes 36 and 38 of upper and lower housing sections 24 and 26, enabling a pivoting movement of valve body 30 about an axis 39 thereby defined.

Ball valve body 30 is formed with a female receptacle comprising a stepped bore hole 40 which extends from one end 42 thereof for a depth reaching the vicinity of axis 39. Bore hole 40 is designed to suit the shape of male coupling 20, which may be rotated therein. The continuation of stepped bore hole 40 is provided by fixed diameter bore hole 44 which extends through an integrally formed spherical end cap 46 of valve body 30. Opposite spherical end cap 46 there is disposed a sealing bushing 48 having a concave contour in its outer edge and being retained in a recess 50 formed in collar 22 of hose connector 18. An O-ring 52 retained in recess 50 acts as a cushion which exerts a slight pressure against sealing bushing 48, providing a self-adjusting seal maintaining sealing contact with spherical end cap 46 (FIG. 3), providing manufacturing error and surface wear compensation.

As shown in FIGS. 1-5, hose coupling 10 is in normal operating position enabling unrestricted fluid or air flow therethrough between connector 18 and male coupling half 20 which has been inserted in stepped bore hole 40. A specially designed O-ring seal 54 seated in the end of stepped bore hole 40 provides for a sealed connection with the end of male coupling half 20 when inserted therein. The cross-section of O-ring seal 54 reveals an outer surface 55a which is frictionally retained in contact with the sides of bore hole 40 over a greater surface area than that between inner surface 55b and male coupling half 20. This eliminates use of an undercut groove for retaining O-ring 54 in bore hole 40, thereby reducing manufacturing costs.

In accordance with a principal object of the present invention, a positive interlocking and latching means provides the mechanical connection associated with the normal valve operating position shown in FIGS. 1-5. This feature is provided by a mechanical interlock which moves together with and is operated by the ball valve pivoting movement. During a quick connect operation, this design insures mechanical connection before the flow connection, eliminating the danger that compressed air will blow the fittings apart as male coupling half 20 is inserted into stepped bore hole 40. For a quick disconnect operation, the flow connection is broken before the mechanical connection is released. Each of the operating positions for the quick connect/disconnect and normal flow operations is defined by the latching means.

Figure 3:
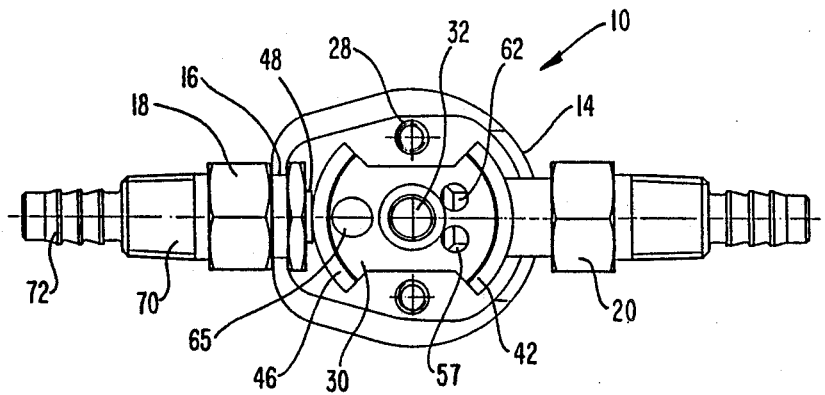
FIGS. 3-4 are top views of the inventive hose coupling with an upper section removed to show, respectively, a ball valve body and partial cutaway of the air connection passageway.
Figure 4:
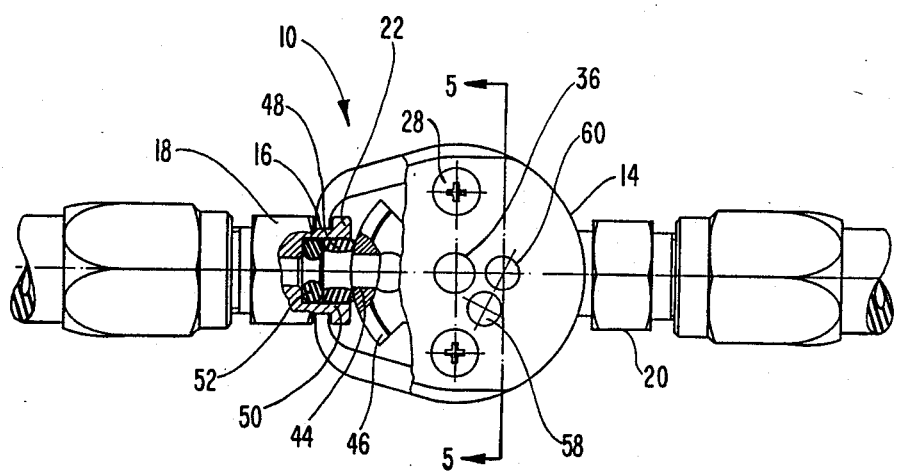
Figure 5:
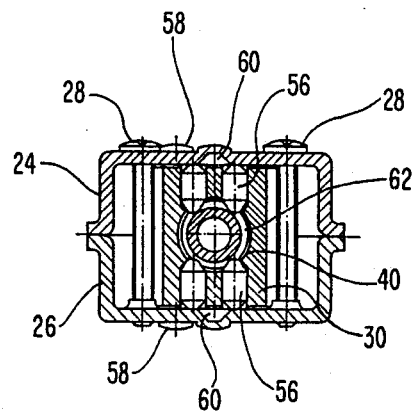
FIG. 5 is a cross-sectional view of the hose coupling taken along section lines 5—5 of FIG. 4, showing a portion of a positive interlocking means providing a secure mechanical connection.

In FIG. 3, a top view is shown with upper housing section 24 removed to reveal ball valve body 30. As best seen in the cross-section of FIG. 5 taken along the section line 5—5 of FIG. 4, the positive interlocking and latching means comprises a set of interlocking pins 56 which are accomodated in a set of holes 57 drilled through the sides of ball valve body 30, proximate axis 39 on either side of stepped bore hole 40. The interlocking pins 56 on each side of bore hole 40 are of a length which allows them freedom of movement between limits defined by a pair of recesses 58 and 60 formed in either of upper or lower housing sections 24 and 26, and an annular groove 62 formed in the end of male coupling half 20.

As described further herein, pivoting movement of ball valve body 30 positively drives interlocking pins 56 such that their ends ride along the inner surface of upper and lower housing sections 24 and 26, causing them to move out of sloped recesses 58, 60 and into annular groove 62. Since the motion of pins 56 is not spring-dependent, it does not suffer from lack of spring tension, etc.

In addition to interlocking pins 56, the positive interlocking and latching means comprises a releasable latch 64 which limits the pivoting movement of body valve 30 for increased operational security. Releasable latch 64 is spring-loaded and is seated in a hole 65 drilled in the side of ball valve body 30 proximate spherical end cap 46. A contoured slot 66 having three circular notches in upper housing section 24 determines three valve operating positions for hose coupling 10 by engaging neck portion 68 of latch 64 in one of the notches to limit the pivoting movement of valve body 30.

Depressing latch 64 clears neck portion 68 from contoured slot 66, allowing movement of male coupling 20 between the valve operating positions. Since ball valve body 30 is positively latched, interlocking pins 56 cannot be accidentally moved. Thus, unlike conventional hose couplings which may be accidentally disconnected if dragged on the floor, the inventive hose coupling 10 prevents this, per OSHA safety standards.

Because of its overall length and the depth of the bore hole 40 therein, ball valve body 30 provides male coupling half 20 with a large surface contact area for the mechanical connection. In addition, the turning angle of pivoting movement between operating positions is less than that associated with prior art designs, approximately 26 degrees vs. 45 degrees.

It will be appreciated that because interlocking pins 56 are located in ball valve body 30 proximate pivot axis 39 and move together therewith over a reduced arc of travel in providing the interlocking function, a reduction in mechanical friction of moving parts is obtained, which increases the useful life of hose coupling 10. In addition, the manufacturing tolerances between ball valve body 30 and housing 12 are less critical, thereby decreasing production costs.

Referring once again to FIG. 2, a feature of the invention is the provision of a multi-use hose fitting 69 connected to male coupling half 20 or hose connector element 18, comprising a tapered MPT fitting 70, connected to a barbed hose shank extension 72. A threaded hose locking sleeve 74 having a barbed interior 76 is connected via MPT threads 78. Hose 80 is push-connected into locking sleeve 74, which is then connected via threads 78 to grip hose 80 tightly in cooperation with the barbs on shank extension 72. This design does not weaken hose 80 with score lines. Multi-use fitting 69 can be modified to replace different individual fittings by removal of shank extension 72 to be threaded pipe connector, used as shown with hose 80, or with a hose clamp and without locking sleeve 74.

Figure 6:
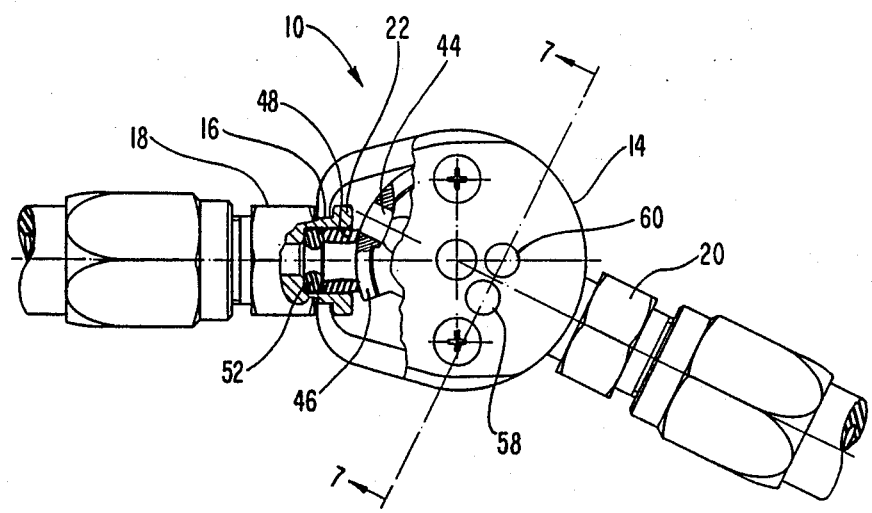
FIG. 6 is a top view of the hose coupling showing a partial cutaway of a quick connect/disconnect operating position enabling connection and disconnection of a male coupling half.

Referring now to FIGS. 6-9, the operation of hose coupling 10 can be understood in relation to pivoting movement of male coupling 20 from the quick connect/disconnect position of FIG. 6. Here, the flow connection is not made since sealing bushing 48 is not aligned with bore hole extension 44, blocking fluid flow therethrough. In this position, interlocking pins 56 are aligned with recesses 58 and 60. If a quick disconnect operation is desired, when male coupling half 20 is removed from bore hole 40, the sloped contour of annular groove 62 forces pins 56 to slide into recesses 58, 60 on both upper and lower housing sections 24 and 26, as shown in the cross-sectional view of FIG. 7 taken along section lines 7—7 of FIG. 6. Thus, male coupling half 20 is removably insertable in stepped bore hole 40, without interference from interlocking pins 56.

Figure 7:
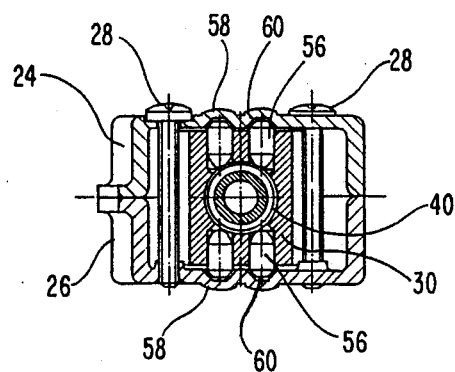
FIG. 7 is a cross-sectional view of the hose coupling taken along section lines 7—7 of FIG. 6, showing the positive interlocking means disengaged.

The quick connect/disconnect position of hose coupling 10 shown in FIGS. 6-7 represents the initial position and precedes the normal position shown in FIGS. 1-5, since as previously stated, the mechanical connection of male coupling half 20 is made prior to the flow connection. Once inserted, pivot of male coupling half 20 in a counter-clockwise direction with respect to the top view of FIG. 6 brings valve body 30 into the normal position from the quick connect/disconnect position. During pivoting movement, interlocking pins 56 slide out of recesses 58 and 60, and become directly engaged in annular groove 62 of male coupling half 20 to provide an interlocking mechanical connection, while releasable latch 64 engages the middle notch of slot 66.

In order to disconnect male coupling half 20 from hose coupling 10, the quick disconnect position of FIG. 6 is restored by depressing latch 64 and pivoting clockwise from the normal valve operating position of FIGS. 1-5. This will initially break the flow connection, after which the mechanical connection can be released by removal of male coupling half 20 from bore hole 40, at which point interlocking pins 56 slide out annular groove 62 and into recesses 58, 60.

In the quick connect operation, hose pressure is not allowed to build up before the mechanical connection is made. Although a slight discharge of fluid occurs, this is dispersed through the volume of housing 12 surrounding ball valve body 30 and out through opening 14, which is provided with sufficient width for this purpose. In similar fashion, built-up pressure is safely discharged during the quick disconnect operation before the mechanical interlock is released.

Figure 8:
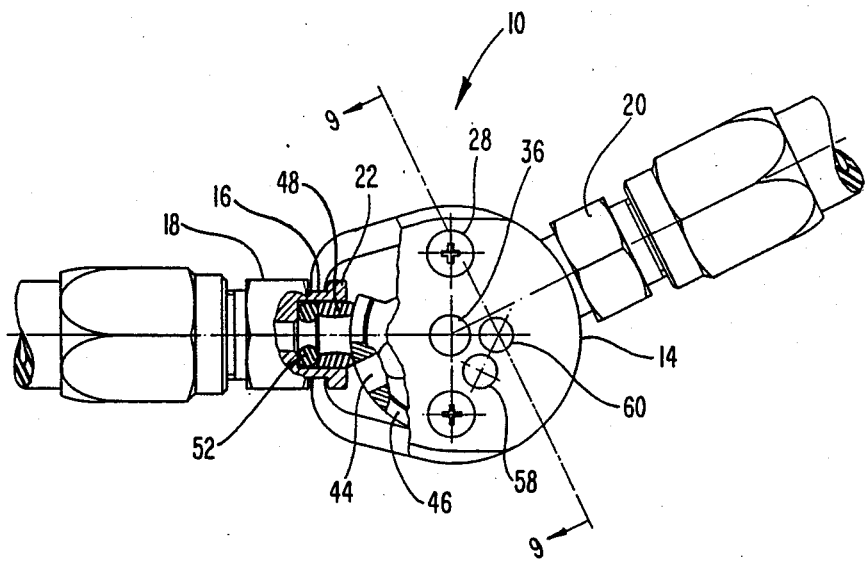
FIG. 8 is a top view of the hose coupling showing a partial cutaway of a mechanically connected operating position wherein the air flow of FIG. 1 is blocked.
Figure 9:
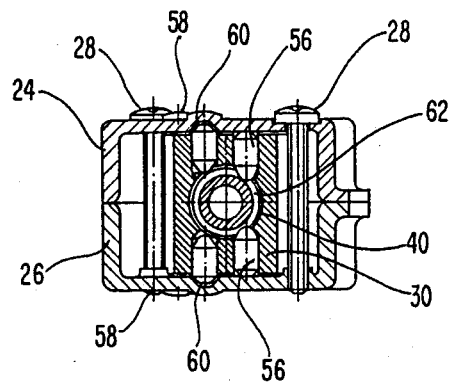
FIG. 9 is a cross-sectional view along section lines 9—9 of FIG. 8, showing positive interlocking means engagement.

Referring now to FIG. 8, there is shown a top view featuring a partial cutaway of hose coupling 10 in a valve operating position in which the mechanical connection is maintained, but the flow connection is blocked. In this position, obtained by counter-clockwise pivot of male coupling half 20, bore hole extension 44 is not aligned with sealing bushing 48. As shown in the cross-sectional view of FIG. 9, two of locking pins 56 are engaged in annular groove 62 of male coupling half 20 for maintaining the mechanical connection, while the remaining two pins 56 are free to slide into recesses 58. This position allows safe shut-off of the fluid or air flow while maintaining a secure mechanical connection.

In accordance with the principles of the present invention, the design of contoured slot 66 may be altered to define the valve operating positions with different functions from those of the preferred embodiment. For example, the notches associated with the normal flow position and the additional locked position may be provided in an alternative embodiment as a single elongated notch, such that pivoting movement between these two positions is effected without depressing the latch 64. Using male coupling half 20 without a hose connection thereto, a "blow gun" operation is obtained with easy finger manipulation of the coupling between the two operating positions.

In another alternative embodiment, the two notches representing the quick connect/disconnect position and the normal operating position may be provided as a keyhole notch, such that latch 64 depression is not required to pivot ball valve body 30 into the normal position. However, upon latching in the normal position, return to the quick disconnect position requires latch 64 depression. Other designs of contoured slot 66 are also conceivable. In all cases, by limiting the pivoting movement of ball valve body 30, releasable latch 64 guides the movement such that bore hole 40 is always accessible.

Figure 11:
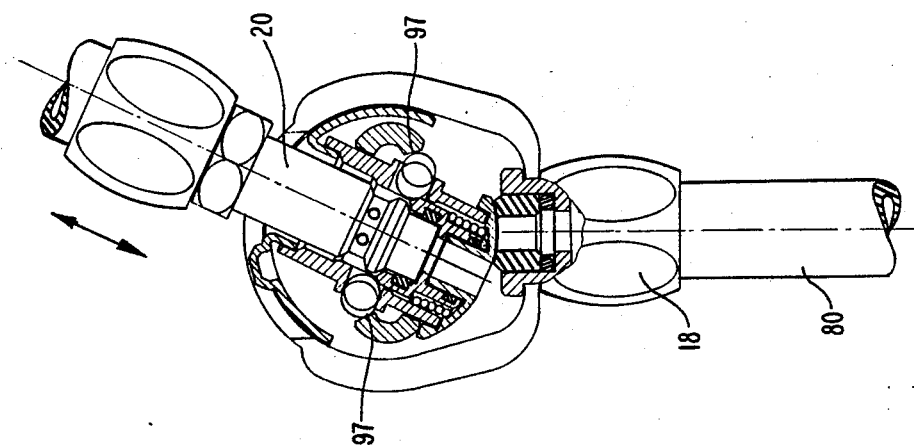
FIGS. 10 and 11 are alternative embodiments of the inventive hose coupling showing, respectively, cross-sectional top views thereof in air flow and disconnect positions.
Figure 10:
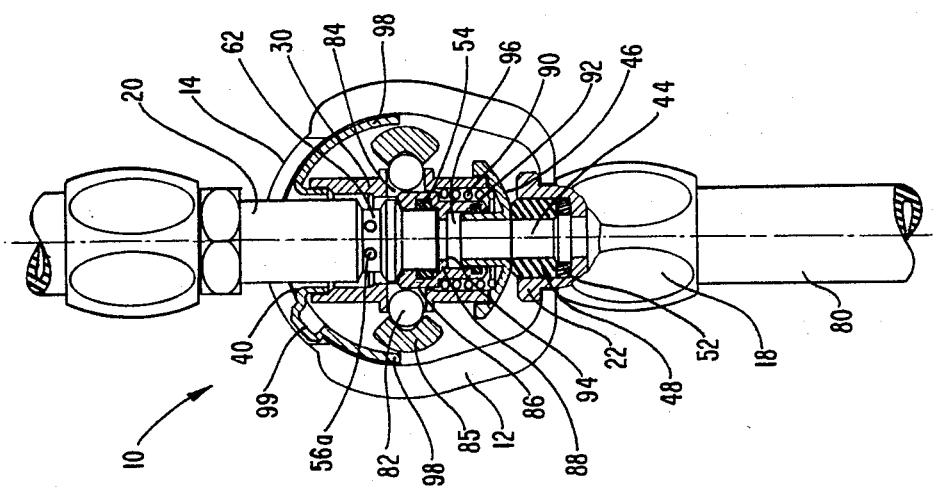

Referring now to FIGS. 10-11, there is shown still another alternative embodiment of inventive hose coupling 10. In this arrangement, ball valve body 30 is altered so as to eliminate the external releasable latch 64 in housing upper section 24. Instead, the latch is provided as a pair of beads 82 which are seated within apertures 84 formed in the valve body 30 walls, each bead opposite one of a pair of notched fasteners 85 located on a respective side. Notched fasteners 85 are adapted to replace fasteners 28. The outer edge 86 of a moveable locking sleeve 88 disposed within the ball valve body 30 blocks latching beads 82 from inward movement in the apertures 84, thus preventing ball valve body 30 rotation.

Upon depression of male coupling half 20 in movable locking sleeve 88, spring 90 is compressed and locking sleeve 88 rides on O-ring 92 until shoulder 94 thereof engages spherical end cap 46, thereby closing gap 96. This removes the blockage of locking sleeve 88 outer edge 86, allowing latching beads 82 to move inwards and permitting valve body 30 to be rotated against notched fasteners 85. In this arrangement, the interlocking pins 56 are replaced by balls 56a, and once these are aligned with recesses 58, 60 on the inner surface of the housing upper and lower section 24 and 26, they slide out of annular groove 62, allowing removal of male coupling half 20 in the quick-disconnect position.

As male coupling half 20 is removed, spring 90 pushes locking sleeve 88 outer edge 86 so as to force latching beads 82 against the sloped edges 97 of notched fasteners 85, where they are held in position, preventing ball valve body 30 rotation. Air flow is disconnected by spherical end cap 46 of ball valve 30, and can only be reestablished by re-insertion of male coupling half 20 in stepped bore hole 40. Once re-inserted, depression of locking sleeve 88 against spring 90 again allows latching beads 82 freedom of movement within apertures 84, such that ball valve body 30 may be returned to the air flow position.

By elimination of the external releasable latch 64, the embodiment of FIGS. 10-11 allows for a smaller overall thickness dimension of housing 12. In addition, by requiring the user to hold male coupling half 20 and depress it in ball valve body 30 against locking sleeve 88 before it can be rotated, this arrangement eliminates unsafe conditions. This is because air flow is prevented until male coupling half 20 is mechanically interlocked via balls 56a. Where hose coupling 10 is wall-mounted, one-hand operation is possible, while the downstream male coupling half 20 is safely held, preventing it from "whipping" dangerously.

As shown in FIGS. 10-11, ball valve body 30 is provided with a shutter 98 which extends from bore hole 40 on either side. A projection 99 formed on one side of shutter 98 abuts housing 12 when ball valve body 30 is in the air flow position, preventing it from rotating any further. Elimination of projection 99 allows this rotation and provides an additional coupling position in which the air flow is blocked, while maintaining male coupling half 20 mechanically interlocked in ball valve body 30. In another arrangement, projection 99 is placed on the other side of male coupling half 20, preventing rotation of ball valve body 30 into the quick-disconnect position, so that air flow and blocked positions are both provided in mechanically interlocked fashion.

In summary, the present invention provides a practical, simply constructed hose coupling design which achieves lower manufacturing costs and offers increased security and longevity of operation while reducing friction of moving parts.

Having described the invention with regard to certain specific embodiments, it is to be understood that the description is not meant as a limitation since further modifications may now suggest themselves to those skilled in the art and it is intended to cover such modifications as fall within the scope of the appended claims.

I claim:

1. A quick-disconnect hose coupling device comprising:

a housing having an opening at an end thereof for retention of a hose connector element therein;

a ball valve body disposed in said housing and being pivotable therein about an axis, said ball valve body having formed therein a receptacle for insertion of a male coupling half through an opening in an opposite end of said housing; and positive interlocking means contained within said ball valve body proximate said pivot axis and cooperating with said housing to allow insertion of said male coupling half in said receptacle when said ball valve body is pivoted to a first position whereat it does not communicate with said connector element, said ball valve body being pivotable to a second position whereat said positive interlocking means retentively engages said male coupling half in said receptacle prior to alignment with said connector element for communication therewith, said engagement being releasable when said first position is reestablished.

2. The device of claim 1 wherein said housing comprises a pair of shell-shaped sections held together by fasteners.

3. The device of claim 1 wherein said positive interlocking means comprises a set of pins retained within said ball valve body and arranged to alternately remove and provide interference with said receptacle in accordance with pivoting movement of said ball valve body in respective first and second positions.

4. The device of claim 3 wherein said pivoting movement positively drives said set of pins such that the ends thereof ride along inner surfaces of said housing and slide between recesses therein and said receptacle.

5. The device of claim 1 further comprising latching means movable with said ball valve body and cooperating with said housing for securing said ball valve body in either of said first and second positions.

6. The device of claim 1 wherein said ball valve body is pivotable to a third position whereat it does not communicate with said hose connector element while said positive interlocking means engages said male coupling half for retention in said receptacle.

7. The device of claim 6 further comprising latching means movable with said ball valve body and cooperating with said housing for securing said ball valve body in any of said first, second and third positions.

8. The device of claim 7 wherein said latching means comprises a releasable latch mounted in said ball valve body and engaging a contoured slot in said housing for securing same.

9. The device of claim 8 wherein pivoting movement of said ball valve body from said second to said third position is not dependent on operation of said latch.

10. The device of claim 1 wherein said hose connector element communication with said ball valve body is established via a sealing bushing seated in a recess of said hose connector element, an O-ring being disposed within said recess for automatically providing said communication with a sealing adjustment.

11. The device of claim 1 wherein at least one of said male coupling half and said hose connector element are supplied with fluid flow by connection to a multi-use fitting comprising a tapered male pipe threaded section integrally formed with a barbed shank extension, and a tapered female pipe threaded locking sleeve having a barbed interior for retaining a hose therein, said hose being gripped between said barbed shank extension and barbed interior when said locking sleeve is connected to said threaded section.

12. The device of claim 1 further comprising latching means comprising a pair of beads which are seated in apertures formed in walls of said ball valve body, opposite a pair of notched fasteners on either side thereof, an outer edge of a spring-loaded movable locking sleeve disposed within said ball valve body blocking said latching beads from inward movement in said apertures and preventing ball valve body rotation, depression of said male coupling half against said movable locking sleeve causing spring compression and removal of said blockage, allowing said valve body to be rotated against said notched fasteners when said latching beads are free to move inward within said valve body apertures.

13. The device of claim 1 wherein said male coupling half is sealed in said receptacle by an O-ring seated and frictionally retained therein by contact with said receptacle over a greater surface area than with said coupling.

14. A method of coupling a male coupling and connector element in quick-disconnect fashion, said method comprising the steps of:
providing a ball valve body having a receptacle formed therein and being pivotable in a housing to a first position;
inserting the male coupling into said receptacle in said first position whereat the connector element is not in communication therewith;
pivoting said ball valve body for movement into a second position within said housing whereat the male coupling is retained in said receptacle by interlocking means contained in said ball valve body for directly interfering with its freedom of movement therein; and
providing communication between said connector element and said receptacle for enabling fluid flow therethrough, said interference being removable upon restoration of said ball valve body to said first position for allowing a quick-disconnect function of the male coupling.

15. The method of claim 14 wherein said pivoting step comprises moving a set of pins contained in said ball valve body into said receptacle in accordance with said movement from said first to said second position, said pins being removable therefrom upon restoration to said first position.

16. The method of claim 14 wherein each of said first and second positions is defined by positively latching said ball valve body to said housing in releasable fashion.

17. The method of claim 14 wherein said ball valve body is pivotable to a third position whereat it does not communicate with said connector element while the male coupling half remains engaged in said receptacle.

18. The method of claim 14 wherein said connector element communication with said receptacle is automatically provided with a sealing adjustment.

19. A quick-disconnect hose coupling device comprising:
a housing having an opening at an end thereof for retention of a hose connector element therein;
a ball valve body disposed in said housing and being pivotable therein about an axis, said ball valve body having formed therein a receptacle for insertion of a male coupling half through an opening in an opposite end of said housing;
latching means comprising a pair of beads which are seated in apertures formed in walls of said ball valve body, opposite a pair of notched fasteners on either side thereof, an outer edge of a spring-loaded movable locking sleeve disposed within said ball valve body blocking said latching beads from inward movement in said apertures and preventing ball valve body rotation; and
positive interlocking means contained within said ball valve body proximate said pivot axis and cooperating with said housing to allow insertion of said male coupling half in said receptacle when said ball valve body is pivoted to a first position whereat it does not communicate with said connector element, said ball valve body being pivotable to a second position by depression of said male coupling half against said movable locking sleeve causing spring compression and removal of said blockage, allowing said valve body to be rotated against said notched fasteners when said latching beads are free to move inward within said valve body apertures, such that said positive interlocking means retentively engages said male coupling half in said receptacle prior to alignment with said connector element for communication therewith, said engagement being releasable when said first position is reestablished.

* * * * *